April 10, 1928.                    A. A. BYERLEIN                    1,665,999
                                      CLUTCH
                                Filed June 16, 1924
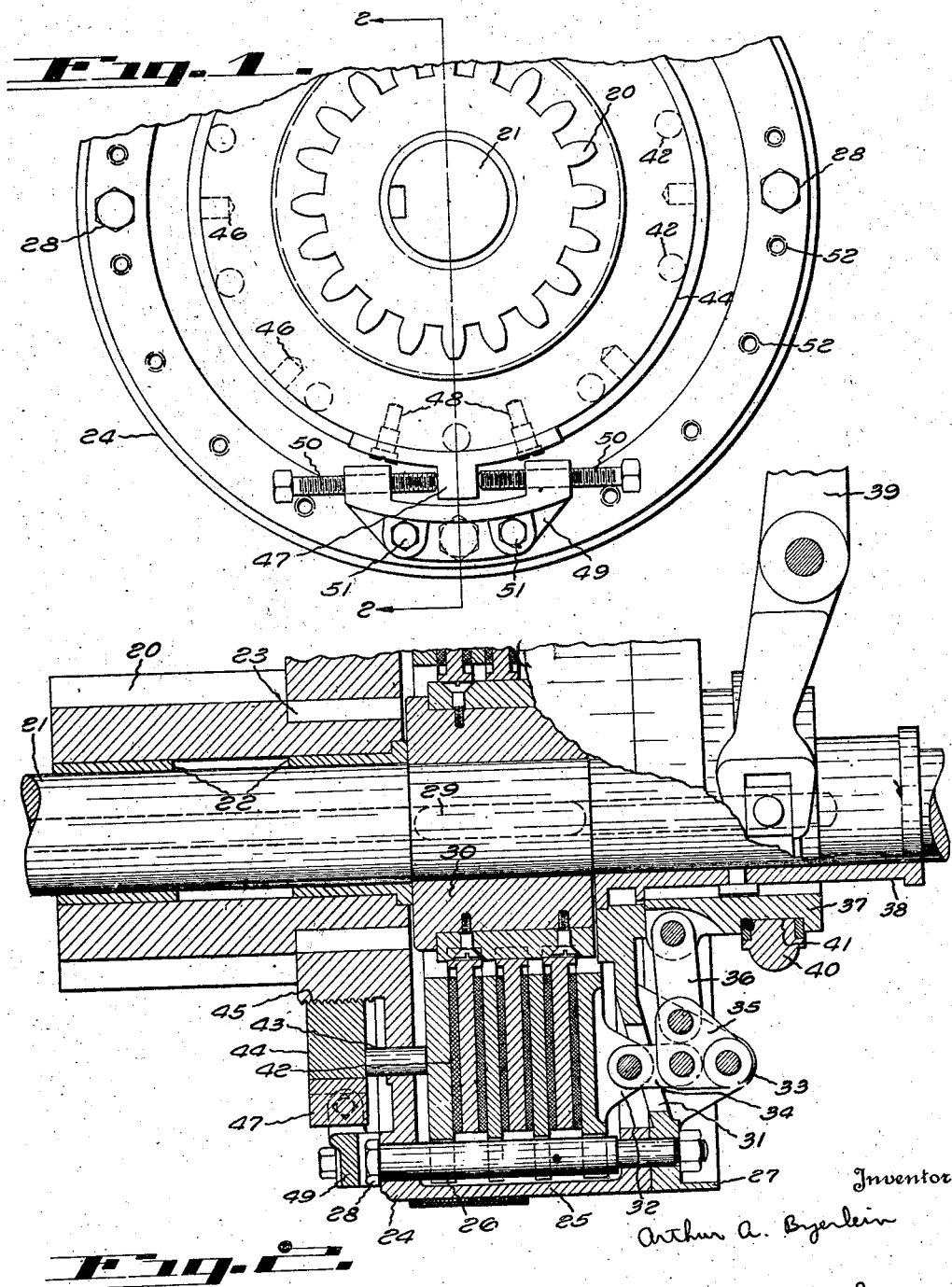

Patented Apr. 10, 1928.

1,665,999

UNITED STATES PATENT OFFICE.

ARTHUR A. BYERLEIN, OF DETROIT, MICHIGAN.

CLUTCH.

Application filed June 16, 1924. Serial No. 720,324.

The present invention relates to clutches, and more particularly clutches of the type adapted for use in heavy machinery.

One of the principal objects of the invention is to provide a friction clutch having means for effecting coarse and fine adjustments of the clutch and for locking the adjusting mechanism in adjusted position.

Further objects of the invention will be apparent from the following description taken in connection with the accompanying drawings, in which;

Fig. 1 is an end elevational view of the present invention; and

Fig. 2 is a longitudinal vertical sectional view taken on line 2—2 of Fig. 1.

In friction clutches for use in connection with heavy machinery, such as drawing presses adapted for working sheet metal to form automobile bodies, it has been a problem to secure proper adjustment of the frictional elements of the clutch and to maintain such adjustment owing to the great size and weight of the parts and the difficulty of moving them. The present invention contemplates overcoming this difficulty by the introduction in a clutch of suitable means for effecting a rapid and also a slow adjustment of the frictional elements and for locking the parts in their adjusted position.

Referring to the drawings, 20 designates a pinion which will herein be termed the driven pinion, this driven pinion being mounted for rotation upon the driving shaft 21. Suitable bushings 22 are provided in the driven pinion 20 for rotation upon the shaft 21. Secured to one end of the pinion 20, as by means of a key 23 is a clutch casing or drum 24 having a cylindrical portion 25 adapted to house the friction-clutch elements, which are illustrated as discs, 26. A cover 27 closes the one end of the clutch drum 24 and serves to completely house the discs. The cover 27 is held in place by means of a number of bolts 28 which are adapted to receive slidably thereon extensions formed on certain of the discs 26. Within the clutch casing 24 and rigidly secured to the driving shaft 21 by means of a key 29 is a collar 30 to the outer periphery of which are slidably keyed the remaining clutch discs 26.

For convenience in description the driven pinion 20, the clutch drum 24 and the other parts secured to rotate therewith are herein designated as the driven clutch member; likewise the driving shaft 21 and the parts secured for rotation therewith, including the collar 30 and the friction elements keyed thereto, are herein termed the driving clutch member. As is well understood, the driven clutch member is clutched to the driving clutch member by compressing the frictional discs under such pressure that the driving and the driven members are caused to rotate together. The driven clutch member is released from the driving clutch member by merely releasing the pressure upon the discs. The mechanism for clutching together or releasing the driving and the driven members will now be described. The cover 27 is provided with a plurality of apertures 31 which are disposed in a circle about the shaft 21. Adjacent each of these apertures the outside clutch disc is provided with lugs 32 and the cover 27 is provided with lugs 33. Toggle links 34 and 35 are pivotally connected between the lugs 32 and 33, which when fully extended as shown in Fig. 2 are adapted to hold the frictional discs in clutching engagement, and when broken to hold the discs out of driving engagement. The toggle is operated by means of a link 36 which is pivotally connected to a sleeve 37 slidably mounted upon a guide 38, the latter extending outwardly from the cover 27 and being rotatable upon shaft 21. Movement of the sleeve 37 is controlled by operating lever 39 through a collar 40 slidably mounted in a circumferential groove 41 formed in sleeve 37.

Adjustment of the friction discs 26 is effected by means of a number of circumferentially disposed adjusting pins 42 which pass axially through apertures 43 formed in clutch casing 24, the inner ends of the pins abutting against the end clutch element or disc 26. An adjusting ring 44 which has screw threaded engagement at 45 with a boss upon the clutch drum 24 is adapted to bear against the opposite ends of the adjusting pins 42 and to move the pins 42 simultaneously towards the clutch discs 26. The adjusting ring 44 is provided about its periphery with a number of holes 46 or other form of tool-hold adapted to receive a suitable tool, whereby the adjusting ring may be rotated on screw threads 45 thereby effecting a rapid or coarse adjustment of the clutch discs.

To effect a slow or fine adjustment of the clutch discs the adjusting ring 44 is provided with a lug 47 which is fastened to its periphery by means of screws 48. After the rapid or coarse adjustment of the clutch has been effected, a bracket 49 carrying the adjusting screws 50 is secured to the clutch casing 24 in such a position that the lug 47 comes between the two adjusting screws 50 as indicated in Fig. 1. The bracket 49 is secured in position by means of the screws 51 which are received in tapped holes 52. The tapped holes 52 are distributed in a circle over the face of the clutch casing 24, so that the bracket 49 can always be secured opposite the lug 47 in such position as to receive the lug between the adjusting screws 50. The slow or fine adjustment of the clutch is secured by turning one of the screws 50 in the desired direction, and after the adjustment is completed, the adjusting ring 44 may be locked in position by turning the other screw 50 so that the lug 47 is rigidly held between the two adjusting screws.

From the foregoing it will be apparent that the present invention provides adjusting means particularly adapted for friction clutches of extreme size and weight in which accurate adjustment of the parts is ordinarily difficult to secure by reason of the large size, weight and friction of the parts. The present invention has the advantage that the adjusting ring may first be operated rapidly to effect the coarse adjustment of the clutch, and may then be operated very slowly to effect the fine adjustment of the clutch, thereby giving a more perfect control than has heretofore been possible in clutches of large size. It has the still further advantage of positive locking of the clutch in its desired adjustment.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a clutch apparatus of the character described, clutch members adapted to be clutched together, said clutch members carrying means adapted to be moved into and out of engagement with one another, operating mechanism for controlling the engagement of said means, and adjusting mechanism for the clutch, said mechanism comprising an abutment operatively connected with said means, means operable for effecting a rapid adjustment of the abutment, and means operable for effecting a slow adjustment of the abutment, said adjusting means being independent of said operating mechanism and adjustable while maintaining the clutch in its assembled condition.

2. In a clutch apparatus of the character described, clutch members adapted to be clutched together, said clutch members carrying means adapted to be moved into and out of engagement with one another, a rotatable adjusting member operatively connected with one of the clutch members, means for effecting a rapid adjustment of the adjustment member, and means for effecting a slow movement of the adjustment member, said last mentioned means being constructed and arranged for attachment to the clutch in a plurality of positions thereon.

3. In a clutch apparatus of the character described, clutch members adapted to be clutched together, said clutch members carrying means adapted to be moved into and out of engagement with one another, a rotatable adjusting member operatively connected with one of the clutch members, means for effecting a rapid adjustment of the adjustment member, and means for effecting a slow movement of the adjustment member, said last mentioned means including an adjusting screw disposed tangentially to the adjusting member.

4. In a clutch apparatus of the character described, clutch members adapted to be clutched together, said clutch members carrying means adapted to be moved into and out of engagement with one another, a rotatable adjusting member operatively connected with one of the clutch members, means for effecting a rapid adjustment of the adjustment member, and means for effecting a slow movement of the adjustment member, said last mentioned means including a pair of opposed adjusting screws for moving said adjusting member.

5. In a clutch apparatus having clutch elements movable into and out of engagement with one another, a clutch member carrying certain of said clutch elements, a clutch adjusting member carried by said clutch member and mounted thereon for effecting a rapid adjustment of the clutch, and means cooperating with said adjusting member for effecting a slow adjustment of the clutch, said means including a fixed lug part secured to one of said members and an adjusting screw carried by the other member and adapted to engage said lug, said adjusting means being adjustable while maintaining the clutch in assembled condition.

6. In a clutch apparatus having clutch elements movable into and out of engagement with one another, a clutch member carrying certain of said clutch elements, a clutch adjusting member carried by said clutch member and mounted thereon for effecting a rapid adjustment of the clutch, and means cooperating with said adjusting member for effecting a slow adjustment of the clutch, said means including a lug part secured to one of said members and a bracket part secured to the other member and carrying an adjusting screw adapted to engage the lug part and means for securing one of said parts in any one of a plurality of operative positions on its supporting member.

7. In a clutch apparatus having clutch elements movable into and out of engagement with one another, a clutch member carrying certain of said clutch elements, an adjusting ring mounted on said clutch member in screw threaded relation therewith, said adjusting ring having a toolhold adapted for the reception of a suitable tool whereby a rapid adjusting movement of the adjusting ring may be made, and screw means for effecting a slow adjusting movement of the adjusting ring.

8. In a clutch apparatus having disc clutch elements movable into and out of engagement with one another, a clutch member carrying certain of said clutch elements and forming a casing therefor said casing having a plurality of apertures adjacent one of the discs, adjusting pins passing through said apertures for engagement with said disc, an adjusting ring engaging said pins, said adjusting ring having screw-threaded engagement with the casing and adapted for rotation to effect a rapid adjustment of the clutch elements, a lug secured to the adjusting ring, a bracket secured to the casing and means cooperating with the lug and the bracket for effecting a slow adjustment of clutch elements and adjusting ring, and for locking the adjusting ring in adjusted position.

9. In a clutch apparatus having disc clutch elements movable into and out of engagement with one another, a clutch member carrying certain of said clutch elements and forming a casing therefor said casing having a plurality of apertures adjacent one of the discs, adjusting pins passing through said apertures for engagement with said disc, an adjusting ring engaging said pins, said adjusting ring having screw threaded engagement with the casing and adapted for rotation to effect a rapid adjustment of the clutch elements, a lug secured to the adjusting ring, a bracket secured to the casing and means cooperating with the lug and the bracket for effecting a slow adjustment of the clutch elements and adjusting ring, and for locking the adjusting ring in adjusted position, and means for attaching the bracket in one of a plurality of positions on the casing.

10. A clutch of the character described comprising clutch elements adapted to be moved into and out of clutching engagement with one another, means for moving said clutch elements into engagement with one another, and adjusting mechanism for adjusting the engagement of said clutch elements, said adjusting mechanism comprising means operable for effecting rapid adjustment and means operable for effecting a slow adjustment, said adjusting means being independent of said means for moving the clutch elements, said adjusting mechanism being so constructed and arranged as to enable operation of either of the adjusting means while maintaining the clutch in its assembled condition.

11. A clutch of the character described comprising clutch elements adapted to be moved into and out of clutching engagement with one another, operating mechanism for said clutch elements, adjusting mechanism for adjusting the engagement of said clutch elements, said adjusting mechanism comprising means operable for effecting rapid adjustment and means operable for effecting a slow adjustment, said adjusting mechanism being independent of said operating mechanism, said adjusting mechanism being so constructed and arranged as to enable operation of either of the adjusting means while maintaining the clutch in its assembled condition, and means for locking said mechanism in adjusted position.

In testimony whereof I hereto affix my signature.

ARTHUR A. BYERLEIN.